(12) United States Patent
Lay (10) Patent No.: US 7,365,889 B2
(45) Date of Patent: Apr. 29, 2008

(54) SYSTEM AND METHOD FOR TRANSPARENCY OPTIMIZATION

(75) Inventor: Daniel Travis Lay, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1311 days.

(21) Appl. No.: 09/964,058

(22) Filed: Sep. 26, 2001

(65) Prior Publication Data
US 2003/0058487 A1   Mar. 27, 2003

(51) Int. Cl.
*H04N 1/46* (2006.01)

(52) U.S. Cl. .............. 358/506; 358/1.15; 358/1.2; 358/1.9; 358/1.11; 358/487; 358/486; 358/405; 358/441; 399/378; 355/40; 355/41; 715/542; 345/467

(58) Field of Classification Search ............ 358/1.15, 358/1.2, 506, 487, 1.9, 1.11, 486, 405, 441; 399/378; 355/40, 41; 715/542; 345/467
See application file for complete search history.

(56) References Cited

U.S. PATENT DOCUMENTS

| | | | | |
|---|---|---|---|---|
| 5,239,392 A * | 8/1993 | Suzuki et al. | ............... | 358/474 |
| 5,263,132 A * | 11/1993 | Parker et al. | ............... | 715/542 |
| 5,283,671 A * | 2/1994 | Stewart et al. | ............. | 358/532 |
| 5,381,526 A * | 1/1995 | Ellson | ......................... | 345/530 |
| 5,703,700 A * | 12/1997 | Birgmeir et al. | ............ | 358/487 |
| 6,111,659 A * | 8/2000 | Murata | ...................... | 358/296 |
| 6,195,181 B1 * | 2/2001 | Washizu | ...................... | 358/475 |
| 6,226,107 B1 * | 5/2001 | Tsai | ........................... | 358/496 |
| 6,233,063 B1 * | 5/2001 | Bernasconi et al. | ........ | 358/474 |
| 6,366,367 B1 * | 4/2002 | Schreier et al. | ............. | 358/487 |
| 6,552,813 B2 * | 4/2003 | Yacoub | ...................... | 358/1.1 |
| 6,622,625 B1 * | 9/2003 | Sugiyama | ................... | 101/484 |
| 6,734,997 B2 * | 5/2004 | Lin | ............................ | 358/487 |
| 6,753,976 B1 * | 6/2004 | Torpey et al. | ............... | 358/1.9 |
| 6,757,071 B1 * | 6/2004 | Goodman et al. | ......... | 358/1.13 |
| 6,762,863 B1 * | 7/2004 | Minakuti et al. | ........... | 358/487 |
| 6,854,839 B2 * | 2/2005 | Collier et al. | ............... | 347/100 |
| 6,873,820 B2 * | 3/2005 | Tanaka et al. | ............... | 399/395 |
| 6,914,684 B1 * | 7/2005 | Bolash et al. | ............... | 356/600 |
| 6,981,214 B1 * | 12/2005 | Miller et al. | ................. | 715/517 |
| 6,994,432 B2 * | 2/2006 | Scofield et al. | ............. | 347/105 |
| 7,020,844 B2 * | 3/2006 | Trevino et al. | ............. | 715/772 |
| 2002/0033967 A1 * | 3/2002 | Liu | ............................ | 358/402 |

* cited by examiner

*Primary Examiner*—Twyler Lamb
*Assistant Examiner*—Benjamin Dulaney (57) ABSTRACT

One embodiment pertains to analyzing a document that is to be printed on a transparency, determining whether the document formatting is optimized for transparency printing, and alerting a user if the document formatting is not optimized for transparency printing. Another embodiment pertains to analyzing a document to determine whether the document is a transparency document, determining whether the scanning resolution is appropriate for scanning a transparency where the document is determined to be a transparency document, and alerting a user if the scanning resolution is not appropriate for scanning a transparency where the document is a transparency document and the scanning resolution is inappropriate.

21 Claims, 5 Drawing Sheets

SYSTEM AND METHOD FOR TRANSPARENCY OPTIMIZATION

FIELD OF THE INVENTION

The present disclosure relates to a system and method for transparency optimization. More particularly, the disclosure relates to a system and method with which transparency printing and/or scanning can be optimized.

BACKGROUND OF THE INVENTION

Often, transparencies, i.e., clear or translucent polymeric sheets, are used for the purpose of giving presentations to groups of people. Specifically, transparencies with printed media provided thereon are placed on overhead projectors that shine light through the transparencies so that the media can be projected onto an appropriate viewing surface, such as a screen or wall.

Although transparencies are convenient for sharing information with a group of people, the use of transparencies presents various difficulties that have yet to be addressed both in terms of their printing and their scanning. With respect to printing transparencies, it is easy for the presenter to print media on the transparency that is difficult to see once projected onto the viewing surface. This is particularly the case where the transparencies are created through use of a computing device such as a personal computer (PC). During such creation, the user prepares the transparencies for printing in the same manner in which more standard documents are prepared. Specifically, the user creates a document comprising one or more pages with an appropriate source application such as a word processing application. Once the document is created, the user simply prints the document using transparency sheets as the print media.

The difficulty with transparency creation in the manner described above stems from the fact that the way the document appears when viewed on the user's computing device monitor is not necessarily the way the document will appear when projected onto the viewing surface. This is because image quality is almost invariably poorer when projected as compared to when viewed on a monitor having a high-resolution cathode ray tube which is continually refreshed. In contrast, projection relies upon a light bulb that shines light through drops ink or particles of toner. Therefore, although text may appear large and easy to read on the monitor, it may be too small and therefore difficult to read, once printed on a transparency and projected. In addition, colors that may appear vibrant and easy to see on the monitor may be difficult to see, and sometimes nearly invisible, when projected. Furthermore, while the resolution of various graphics may appear high on the monitor, the resolution may appear poor when projected onto the viewing surface.

Difficulties also arise when scanning previously created transparencies. To cite one example, where relatively low resolution scanning is used to scan the transparencies, a poor electronic version of the transparency may be created. This is particularly true where the transparency has less than ideal resolution to begin with (e.g., where the transparency was created using an ink-based printing device).

In view of the problems identified above, it can be appreciated that it would be desirable to have a system and method for transparency optimization that prevents these difficulties before they occur by aiding the user to optimize transparency printing and/or scanning to obtain desirable results.

SUMMARY OF THE INVENTION

The present disclosure relates to a system and method for transparency optimization. In one arrangement, the system and method pertain to analyzing a document that is to be printed on a transparency, determining whether the document formatting is optimized for transparency printing, and alerting a user if the document formatting is not optimized for transparency printing.

In another arrangement, the system and method pertain to analyzing a document to be scanned to determine whether the document is a transparency document, determining whether the scanning resolution is appropriate for scanning a transparency where the document is determined to be a transparency document, and alerting a user if the scanning resolution is not appropriate for scanning a transparency where the document is a transparency document and the scanning resolution is inappropriate.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed herein is a system and method for transparency optimization. To facilitate description of the system and method, an example system in which the invention can be implemented will first be discussed with reference to the figures. Although this system is described in detail, it will be appreciated that this system is provided for purposes of illustration only and that various modifications are feasible without departing from the inventive concept. After the example system has been described, examples of operation of the system will be provided to explain the manners in which transparency optimization can be achieved.

Figure 1:
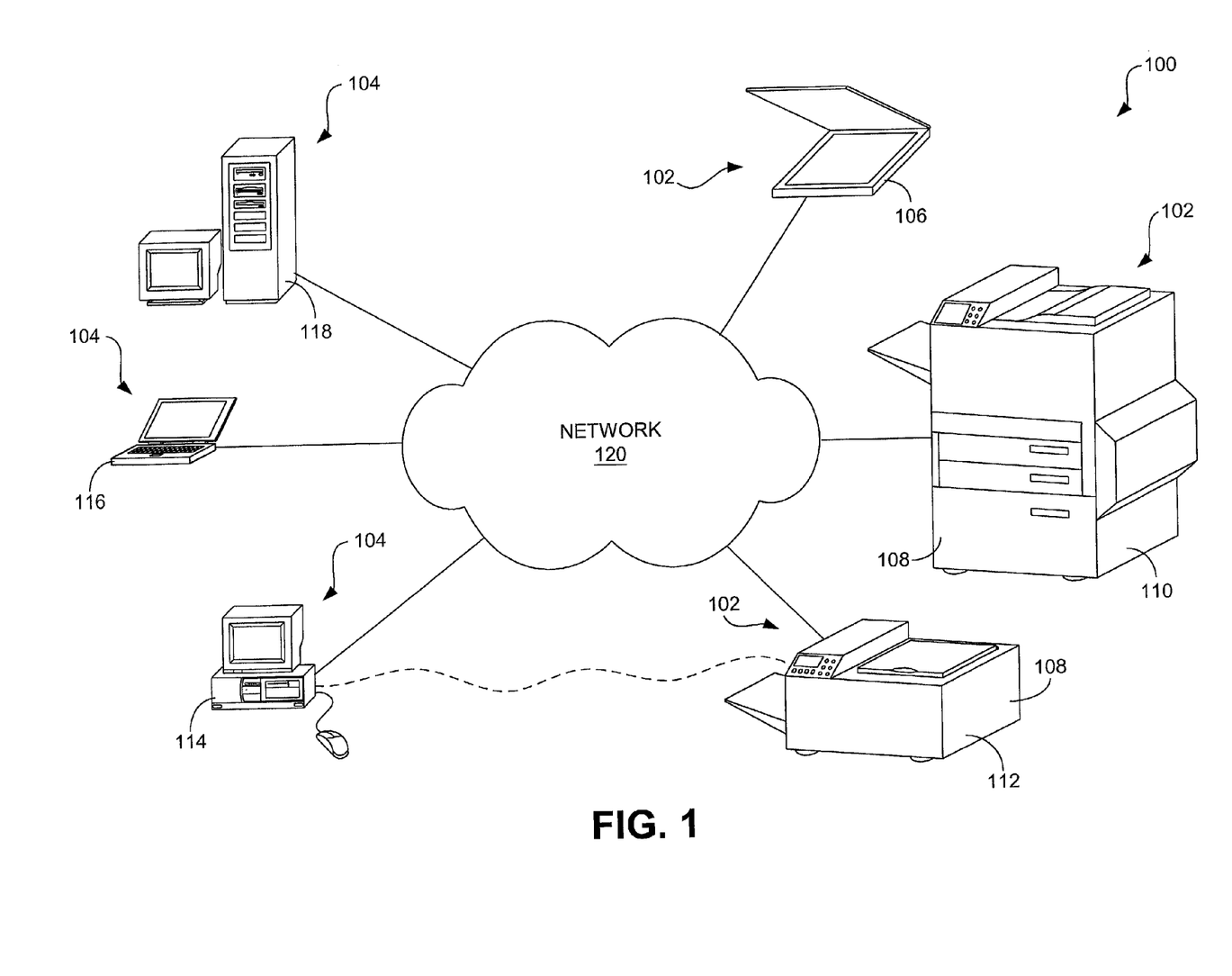
FIG. 1 is a schematic view of an example system in which the invention can be implemented.

Referring now in more detail to the drawings, in which like numerals indicate corresponding parts throughout the several views, FIG. 1 illustrates an example system 100. As indicated in this figure, the system 100 generally comprises peripheral devices 102 and computing devices 104. The peripheral devices 102 can comprise, as shown in FIG. 1, a scanning device (e.g., scanner) 106 and printing devices 108, such as a printer 110 and a multifunction peripheral (MFP) 112. Although specific devices have been identified, it is to be understood that the present disclosure is generally directed to devices that are adapted to scan and/or generate hardcopy documents.

The computing devices 104 comprise devices that are capable of accessing and using the peripheral devices 102 and, more particularly, which are capable of communicating with the peripheral devices by transmitting data to and/or receiving data from the peripheral devices. By way of example, the computing devices 104 can comprise a personal computer (PC) 114, a notebook computer 116, and/or a server 118. Although these particular computing devices are identified in FIG. 1 and discussed herein, it will be appreciated that the computing devices 104 could, alternatively, comprise other types of computing devices including, for instance, handheld computing devices such as personal digital assistants (PDAs), mobile telephones, etc.

As is further identified in FIG. 1, the peripheral devices 102 and the computing devices 104 can, optionally, be connected to a network 120 that typically comprises one or more sub-networks that are communicatively coupled to each other. By way of example, these networks can include one or more local area networks (LANs) and/or wide area networks (WANs). Indeed, in some embodiments, the network 120 may comprise a set of networks that forms part of the Internet. As is depicted in FIG. 1, one or more of the computing devices 104 (e.g., PC 114) can be directly connected to a peripheral device 102 (e.g., a printing device 108). Such an arrangement is likely in a home environment in which the user does not have a home network or in an office environment where the peripheral device(s) 102 is/are used locally. In such a scenario, communications can be facilitated with a direct electrical and/or optical connection, or through wireless communication.

Figure 2:
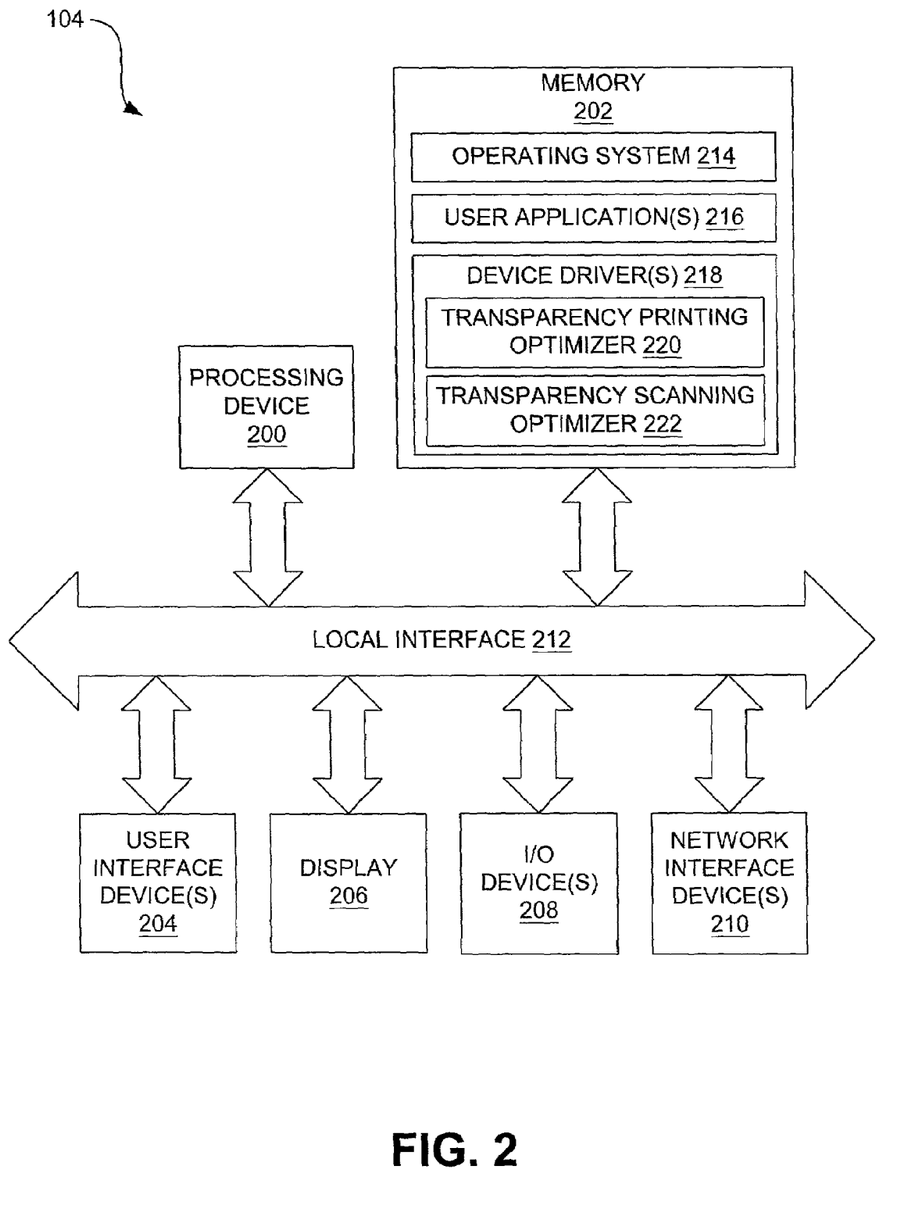
FIG. 2 is a schematic view of a computing device shown in FIG. 1.

FIG. 2 is a schematic view illustrating an example architecture for the computing devices 104 shown in FIG. 1. As indicated in FIG. 2, each computing device 104 can comprise a processing device 200, memory 202, one or more user interface devices 204, a display 206, one or more input/output (I/O) devices 208, and one or more network interface devices 210, each of which is connected to a local interface 212. The processing device 200 can include any custom made or commercially available processor, a central processing unit (CPU) or an auxiliary processor among several processors associated with the computing device 104, a semiconductor based microprocessor (in the form of a microchip), or a macroprocessor. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise those components with which the user can interact with the computing device 104. By way of example, these components can comprise a keyboard, mouse, and/or trackball. Where the computing device 104 comprises a handheld device (e.g., PDA, mobile telephone), these components can comprise function keys or buttons, a touch-sensitive screen, etc. The display 206 can comprise a computer monitor or plasma screen, or a liquid crystal display (LCD) for a handheld device.

With further reference to FIG. 2, the one or more I/O devices 208 are adapted to facilitate connection of the computing device 104 to another device, such as a peripheral device 102, and may therefore include one or more serial, parallel, small computer system interface (SCSI), universal serial bus (USB), IEEE 1394 (e.g., Firewire™), and/or personal area network (PAN) components. The network interface devices 210 comprise the various components used to transmit and/or receive data over the network 120. By way of example, the network interface devices 210 include a device that can communicate both inputs and outputs, for instance, a modulator/demodulator (e.g., modem), wireless (e.g., radio frequency (RF)) transceiver, a telephonic interface, a bridge, a router, network card, etc.

The memory 202 normally comprises an operating system 214, one or more user applications 216, and one or more device drivers 218. The operating system 214 controls the execution of other software and provides scheduling, input-output control, file and data management, memory management, and communication control and related services. The user applications 216 comprise applications that execute on the computing device 104 and which can be used to access and use the peripheral devices 102. By way of example, the user applications 216 can include various source applications that are used to create, modify, and/or identify data to be transmitted to a printing device 108. Such source applications may comprise a word processing application (e.g., Microsoft Word™) and a presentation application (e.g., Microsoft PowerPoint™). In addition, the user applications 216 may comprise a scanning application (e.g., PrecisionScan Pro™) that can be used to control operation of the scanning device 106.

The one or more drivers 218 comprise software and/or firmware that is used to translate data output or identified by the user applications 216 into a format (i.e., language) which is suitable for the peripheral devices 102. Although shown as being provided in the memory 202 of the computing device 104, persons having ordinary skill in the art will recognize that the one or more drivers 218 can be located on another device, such as a peripheral device 102, if desired. The drivers 218 normally include one or more applications which comprise user interfaces (e.g., graphical user interfaces (GUIs)) with which the user can input selections or commands to the drivers. As indicated in FIG. 2, one or more of the device drivers 218 include a transparency printing optimizer 220 and/or a transparency scanning optimizer 222. The optimizers 220 and 222 are used to prevent problems associated with transparency printing and scanning, respectively. The operation of these optimizers 220 and 222 is discussed below in greater detail with reference to FIGS. 4 and 5, respectively.

Figure 3:
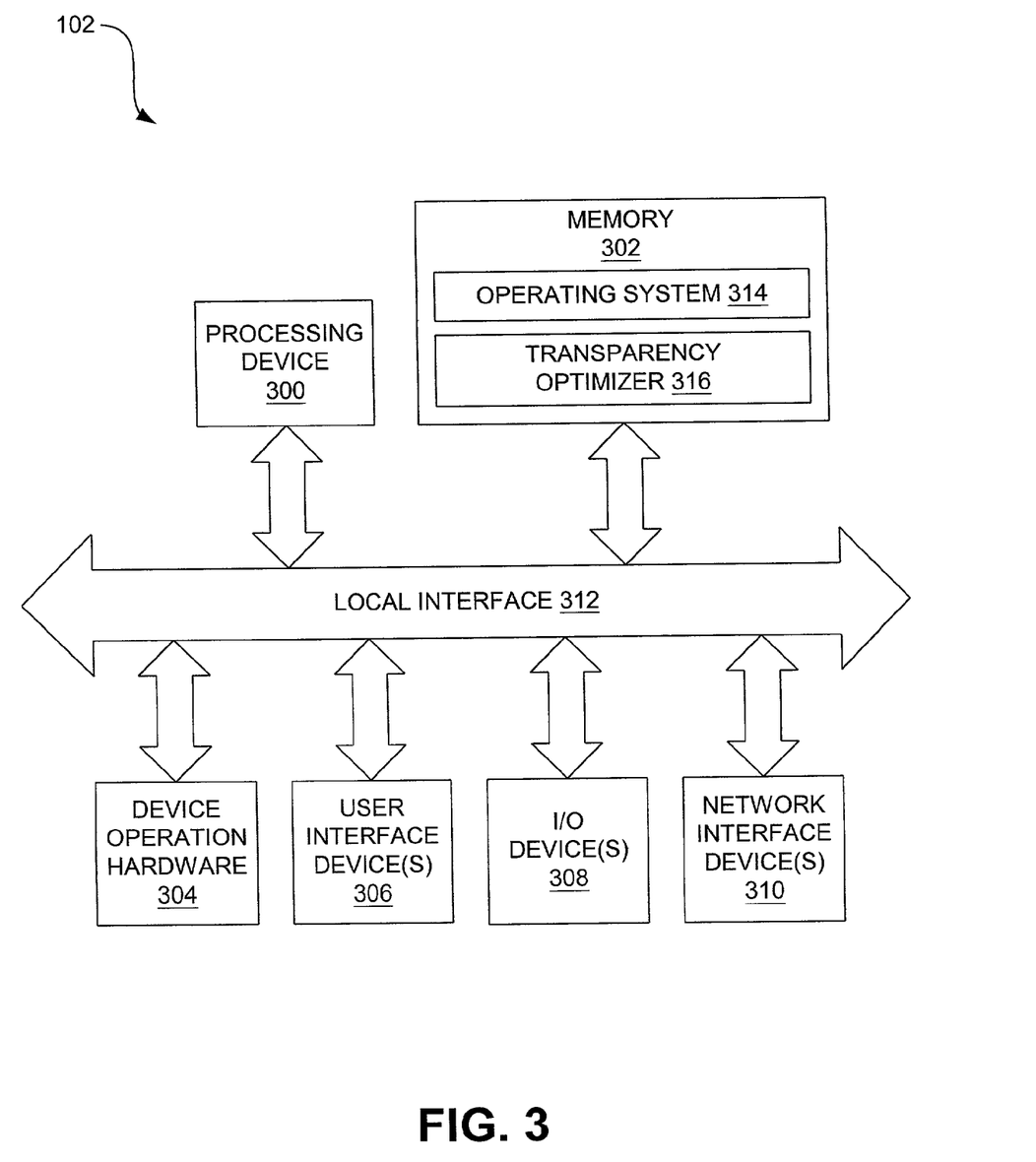
FIG. 3 is a schematic view of a peripheral device shown in FIG. 1.

FIG. 3 is a schematic view illustrating an example architecture for the peripheral devices 102 shown in FIG. 1. As indicated in FIG. 3, each peripheral device 102 can comprise a processing device 300, memory 302, device operation hardware 304, one or more user interface devices 306, one or more input/output (I/O) devices 308, and one or more network interface devices 310. Each of these components is connected to a local interface 312 that, by way of example, comprises one or more internal buses. The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the peripheral device 102.

The device operation hardware 304 comprises the various components with which the core functionality of the peripheral device 102 is facilitated. For example, where the peripheral device 102 comprises a printing device, the device operation hardware 304 can comprise a print engine that is capable of many different configurations. Where the peripheral device 102 comprises a scanning device, the device operation hardware 304 can comprise a scanning mechanism that includes, for example, a light source, light sensing device (e.g., charge-coupled device (CCD)), and various optical elements (e.g., lenses, mirrors, etc.). The one or more user interface devices 306, where provided, typically comprise interface tools with which the device settings can be changed and through which the user can directly communicate commands to the peripheral device 102. In addition, the user interface devices 306 can include a display with which the user can visually interface with the device 102. By way of example, the user interface devices 306 comprise one or more function keys and/or buttons with which the operation of the peripheral device 102 can be controlled and a liquid crystal display (LCD) or a light emitting diode (LED) display. Optionally, the display can be touch-sensitive such that user commands and selections can be entered with the display. The one or more I/O devices 208 and the one or more network interface devices 210 operate and can have similar configuration to the like-named components described above with relation to FIG. 2.

The memory 302 includes various software and/or firmware including an operating system 314 and a transparency optimizer 316. The operating system 314 contains the various commands used to control the general operation of the peripheral device 102 while the transparency optimizer 316 ensures that the various selections made by the user are suitable for transparencies. For instance, the optimizer 316 can be configured to ensure that the formatting selections made by the user are appropriate for printing onto transparencies and, more particularly, will result in a clear, high resolution projected image. Alternatively, the optimizer 316 can be configured to ensure that a resolution setting that has been selected by the user is appropriate for scanning of a transparency and, more particularly, will result in a sharp scanned image. Operation of the transparency optimizer 316 is discussed below along with the discussion of the operation of the transparency printing optimizer 220 with reference to FIG. 4, and along with the discussion of the operation of the transparency scanning optimizer 222 with reference to FIG. 5.

Various software and/or firmware programs have been described herein. It is to be understood that these programs can be stored on any computer-readable medium for use by or in connection with any computer-related system or method. In the context of this document, a computer readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

As discussed above, the invention can be used to ensure that good transparency printing results are obtained by users. Specifically, the transparency printing optimizer 222 of the computing device 104, or the transparency optimizer 316 of the peripheral device 102 (e.g., printer), as the case may be, determines whether the formatting choices the user has made will result in a clear, high resolution projected image. An example of operation of the transparency printing optimizer 222 and the transparency optimizer 316 acting in this capacity is provided in FIG. 4. Beginning with block 400, the optimizer 220, 316 is activated. This activation can occur in a variety of ways. Where the optimizer is the transparency printing optimizer of the computing device 104, activation can occur when an indication that transparencies are to be printed is received. For instance, the user can have selected a "print transparencies" button or checkbox presented with the user application 216 from which the print commands issue. This button or checkbox can be presented to the user at various points in the printing procedure. By way of example, the button or checkbox can be presented as an option in a dialogue box that appears when a "print" command is received within the user application 216. In such a case, the button or checkbox can be presented in the initial dialogue box, or in a lower level dialogue box that is accessed via the initial dialogue box. Where the optimizer comprises the transparency optimizer 316 of the peripheral device 102, activation can occur when a print job is received from another device (e.g., a computing device 102) along with the print job is a communication (e.g., in the job header) that identifies that the user is printing transparencies and that identifies the formatting that has been selected by the user.

Figure 4:
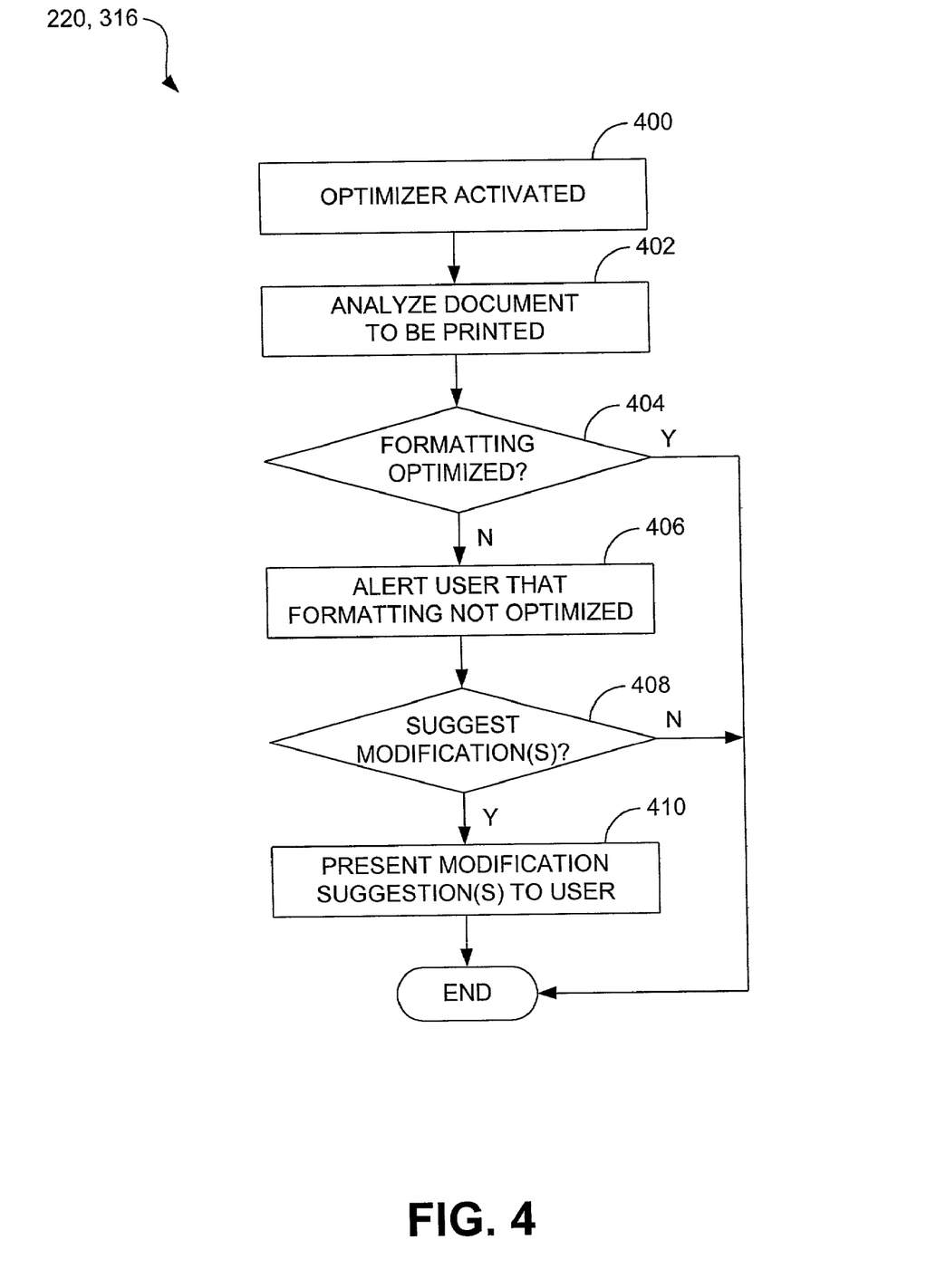
FIG. 4 is a flow diagram that illustrates operation of a transparency printing optimizer shown in FIG. 2 and a transparency optimizer shown in FIG. 3.

Irrespective of the manner in which the optimizer 220, 316 is activated, the optimizer then analyzes the document to be printed, as indicated in block 402. In particular, the optimizer 220, 316 determines whether the various formatting selections that the user has made will result in a clear, high resolution projected image when the transparencies are used with a overhead projector. Therefore, the optimizer 220, 316 can determine whether the document formatting is optimized for transparency printing as indicated in decision element 404. This determination can be made based upon the nature of various specific formatting attributes of the document. For instance, the determination can be based upon the font size used, the colors used, printing resolution selected, etc. Regarding font size, the optimizer 220, 316 may be configured to determine that font sizes smaller than a given size, e.g., 12 point, will potentially provide a poor result. With respect to colors, the optimizer 220, 316 may be configured to determine that any colors lighter than some predetermined darkness will potentially provide a poor result. With regard to resolution, the optimizer 220, 316 may be configured to determine that any resolution below some predetermined resolution threshold will potentially provide a poor result. Although font size, colors, and resolution have been identified with specificity herein, persons having ordinary skill in the art will appreciate that any other formatting attribute that would potentially provide a poor result may be considered in making the determination. Examples of other formatting attributes include the toner density setting (e.g., normal versus an economy setting in which less toner is used), whether duplex printing has been selected, whether water marks have been used, etc.

If the document formatting is optimized for transparency printing, flow is terminated for the optimizer 220, 316 and the print job may be completed. If, however, the document formatting is not optimized for transparency printing, flow continues on to block 406 at which the optimizer 220, 316 alerts the user to this condition. Where the optimizer is the transparency printing optimizer 220 of the computing device 104, this step can comprise the display of a pop-up dialogue box that identifies that the document formatting is not optimized. In some arrangements, the dialogue box can specifically identify what formatting choices may be problematic and, optionally, where they appear in the document to be printed (e.g., by page number). Where the optimizer comprises the transparency optimizer 316, alerting the user can comprise transmitting a warning message back to the computing device that transmitted the print job to the peripheral device 102 so that a pop-up dialogue box similar to that described above can be presented to the user.

At this point, it can further be determined whether the optimizer 220, 316 will present document formatting modification suggestions to the user that will ensure that the printed transparencies will provide clear, high resolution projected images, as indicated in decision element 408. If no suggestions are to be provided, flow is terminated. If, on the other hand, one or more suggestions are to be provided, flow continues to block 410 at which the modification suggestion(s) is/are presented to the user. By way of example, the suggestion(s) can be presented to the user along with a dialogue box that alerted the user to the potential problem. The suggestions can comprise, for instance, a larger font size, a darker shade of color, a minimum printing resolution, etc. In some arrangements, the optimizer 220, 316 can be configured to, with the user's permission, automatically adjust the document formatting such that it is optimized for transparency printing. Once the suggestion(s) is/are provided, flow for the optimizer 220, 316 is terminated. At this point, the user can either override the alert and, where provided, suggestion(s), and continue the printing process or heed the warning and interrupt the printing process and return to the user application 216 to optimize the document formatting.

Operating in the manner described above, the optimizer 220, 316 can be used to prevent projection problems before they occur. Accordingly, the user can avoid situations in which transparencies are used that result in an ineffective presentation. Moreover, the optimizer 220, 316 can prevent the waste of relatively expensive transparency printing media in that the user can learn of the inadequacy of his or her formatting choices before the transparencies are printed.

As noted above, transparency scanning can be optimized using the transparency scanning optimizer 222 of the computing device 104 or the transparency optimizer 316 of the peripheral device 102 (e.g., scanner). An example of operation of the transparency printing optimizer 222 and the transparency optimizer 316 acting in this capacity is provided in FIG. 5. Beginning with block 500, the optimizer 222, 316 is activated. As with the activation described above with reference to FIG. 4, this activation can occur in a variety of ways. Where the optimizer is the transparency scanning optimizer 222 of the computing device 104, activation can occur when an indication that transparencies are to be scanned is received. For instance, the user can have selected a "scan transparencies" button or checkbox presented with the user application 216 from which the scan job issues. This button or checkbox can be presented to the user at various points in the scanning procedure. For example, the button or checkbox can be presented as an option in a dialogue box in which the user selects various scanning attributes such as resolution, orientation, scaling, etc. Where the optimizer comprises the transparency optimizer 316 of the peripheral device 102, activation can occur when a scan command is received from another device (e.g., a computing device 102).

Figure 5:
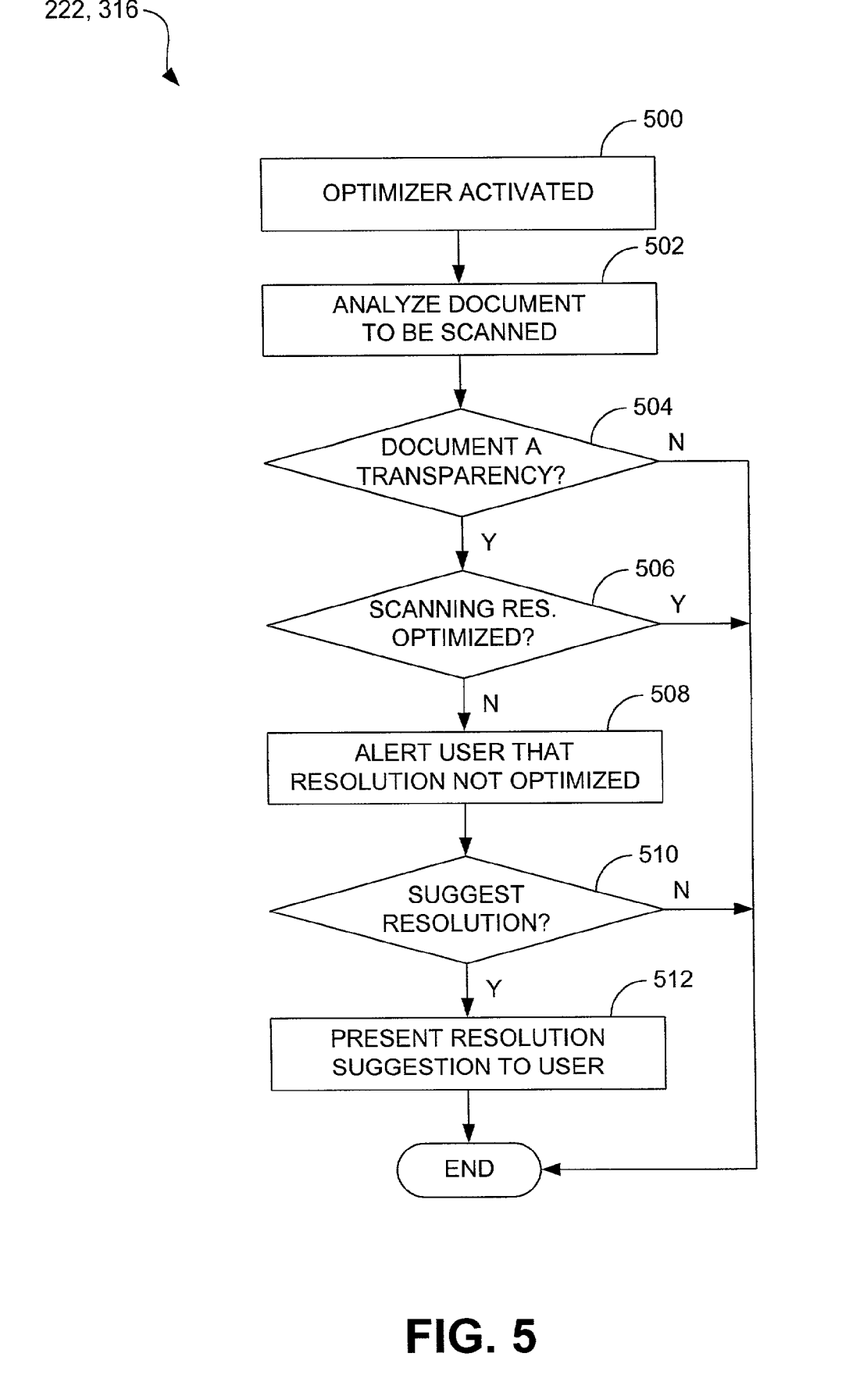
FIG. 5 is a flow diagram that illustrates operation of a transparency scanning optimizers shown in FIG. 2 and a transparency optimizer shown in FIG. 3.

Irrespective of the manner in which the optimizer 222, 316 is activated, the optimizer analyzes the document to be scanned, as indicated in block 502. This analysis can, for instance, occur during an initial scan that often is used to orient, crop, etc. the image to be scanned. During the initial scan, the optimizer 222, 316 analyzes the document to determine whether it is a transparency versus a more conventional type of document (e.g., piece of paper). This analysis can be conducted in a variety of different ways. For instance, the optimizer 222, 316 can be adapted to detect the reflectivity and/or brightness during the initial scan to sense whether the document is a transparency document or not. This detection can be made by an appropriate detector (e.g., CCD of the scanning mechanism or separate light sensor). In another arrangement, the optimizer 222, 316 can be configured to recognize an attribute of the inside of a cover of the peripheral device 102 that covers the document during the scanning procedure. For instance, this attribute can comprise a specific pattern that can be detected or a particular reflective surface that indicates that the document is translucent.

With reference to decision element 504, if the document is not determined to be a transparency, the optimizer 222, 316 is not needed and flow is terminated. If, on the other hand, it is determined that the document is a transparency, flow continues on to decision element 506 at which the optimizer 222, 316 determines whether the scanning resolution that the user has selected (or the default scanning resolution, where applicable) is appropriate. In other words, it can be determined whether the scanning resolution is optimized for scanning transparencies. As noted above, higher scanning resolutions may be preferable for scanning transparencies, particularly those created with an ink-based printing device, in that the resolution of the transparencies may not be as high as would be observed with a paper document. If the resolution is high enough, e.g., 600 dots per inch (dpi), flow is terminated. If, however, it is determined that the resolution is not high enough, e.g., under 600 dpi, flow continues to block 508 at which the optimizer 222, 316 alerts the user that the scanning resolution is not optimized for transparency scanning.

Where the optimizer is the transparency scanning optimizer 222 of the computing device 104, alerting the user can comprise the display of a pop-up dialogue box that identifies that the scanning resolution is not high enough. Where the optimizer comprises the transparency optimizer 316, alerting the user can comprise transmitting a warning message back to the computing device that transmitted the scan job to the peripheral device 102 so that a pop-up dialogue box similar to that described above can be presented to the user.

At this point, it can further be determined whether the optimizer 222, 316 will present a scanning resolution suggestion to the user, as indicated in decision element 510. If no suggestion is to be provided, flow is terminated. If, on the other hand, a suggestion is to be provided, flow continues to block 512 at which the scanning resolution suggestion is presented to the user. By way of example, optimizer 222, 316 can suggest a minimum scanning resolution (e.g., 600 dpi) to the user. This suggestion can be presented to the user along with the dialogue box that alerted the user to the potential problem. Once the suggestion is provided, flow for the optimizer 222, 316 is terminated and the user can either override the alert and continue the scanning process or heed the warning and interrupt the scanning process and select a higher scanning resolution. In some arrangements, the optimizer 222, 316 can offer to automatically change the scanning resolution to a more suitable level. In such a case, the user can simply opt to have the resolution increased.

Operating in the manner described above, the optimizer 222, 316 can be used to prevent wasted time in scanning transparencies with low resolution and obtaining insufficient scanned images.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for optimizing transparency scanning; comprising the steps of:
   analyzing a document to be scanned to determine whether the document is a transparency document;
   determining whether the scanning resolution is appropriate for scanning a transparency where the document is determined to be a transparency document; and
   alerting a user if the scanning resolution is not appropriate for scanning a transparency where the document is a transparency document and the scanning resolution is inappropriate.

2. The method of claim 1, wherein the step of analyzing the document comprises conducting an initial scan of the document and detecting the reflectivity observed during the initial scan.

3. The method of claim 1, wherein the step of analyzing the document comprises conducting an initial scan of the document and detecting the brightness observed during the initial scan.

4. The method of claim 1, wherein the step of determining whether the scanning resolution is appropriate comprises determining whether a selected scanning resolution is at least a minimum scanning resolution threshold.

5. The method of claim 1, wherein the step of alerting a user if the scanning resolution is not appropriate for scanning a transparency comprises facilitating presentation of a warning dialogue box to the user.

6. The method of claim 1, further comprising the step of suggesting an alternative scanning resolution where the scanning resolution is not optimized for transparency scanning.

7. The method of claim 6, further comprising the step of automatically adjusting the scanning resolution such that it is optimized for transparency scanning.

8. A system for optimizing transparency scanning; comprising:
   means for analyzing a document to be scanned to determine whether the document is a transparency document;
   means for determining whether the scanning resolution is appropriate for scanning a transparency where the document is determined to be a transparency document; and
   means for alerting a user if the scanning resolution is not appropriate for scanning a transparency where the document is a transparency document and the scanning resolution is inappropriate.

9. The system of claim 8, wherein the means for analyzing the document comprise means for detecting the reflectivity observed during an initial scan of the transparency document.

10. The system of claim 8, wherein the means for analyzing the document comprise means for detecting the brightness observed during an initial scan of the transparency document.

11. The system of claim 8, wherein the means for determining whether the scanning resolution is appropriate comprises means for determining whether a selected scanning resolution is at least a minimum scanning resolution threshold.

12. The system of claim 8, wherein the means for alerting a user if the scanning resolution is not appropriate for scanning a transparency comprises means for facilitating presentation of a warning dialogue box to the user.

13. The system of claim 8, further comprising means for suggesting an alternative scanning resolution where the scanning resolution is not optimized for transparency scanning.

14. The system of claim 8, further comprising means for automatically adjusting the scanning resolution such that it is optimized for transparency scanning.

15. A computer readable medium containing computer readable instructions configured to direct an apparatus to:
   analyze a document to be scanned to determine whether the document is a transparency document;
   determine whether the scanning resolution is appropriate for scanning a transparency where the document is determined to be a transparency document; and
   alert a user if the scanning resolution is not appropriate for scanning a transparency where the document is a transparency document and the scanning resolution is inappropriate.

16. The computer readable medium of claim 15, wherein the instructions and further configured to direct the apparatus to conduct an initial scan of the document and detect the reflectivity observed during the initial scan.

17. The computer readable medium of claim 15, wherein the instructions are configured direct the apparatus to conduct an initial scan of the document and detect the brightness observed during the initial scan.

18. The computer readable medium of claim 15, wherein the instructions are configured direct the apparatus to determine whether a selected scanning resolution is at least a minimum scanning resolution threshold.

19. The computer readable medium of claim 15, wherein the instructions are configured direct the apparatus to present a warning dialogue box to the user.

20. The computer readable medium of claim 15, wherein the instructions are configured direct the apparatus to suggest an alternative scanning resolution where the scanning resolution is not optimized for transparency scanning.

21. The computer readable medium of claim 15, wherein the instructions are configured direct the apparatus to automatically adjust the scanning resolution such that it is optimized for transparency scanning.

* * * * *